(12) United States Patent
Park et al.

(10) Patent No.: US 7,069,967 B2
(45) Date of Patent: Jul. 4, 2006

(54) POWER TOOL

(75) Inventors: Keith Park, Ellerton (GB); Peter J. Hosking, Mont Albert (AU)

(73) Assignee: GMCA PTY Limited (AU)

( * ) Notice: Subject to any disclaimer, the term of this patent is extended or adjusted under 35 U.S.C. 154(b) by 103 days.

(21) Appl. No.: 10/660,346

(22) Filed: Sep. 11, 2003

(65) Prior Publication Data
US 2005/0034782 A1 Feb. 17, 2005

(30) Foreign Application Priority Data
Dec. 13, 2002 (AU) ............... 2002953315

(51) Int. Cl.
*B27C 1/02* (2006.01)
*B27C 1/10* (2006.01)

(52) U.S. Cl. ............... 144/154.5; 144/114.1; 30/475

(58) Field of Classification Search ........... 144/136.95, 144/154.5, 114.1, 117.1, 218; 30/475, 478; 409/181, 182, 175
See application file for complete search history.

(56) References Cited

U.S. PATENT DOCUMENTS

| 2,707,502 | A | * | 5/1955 | Noel ........................... 30/475 |
| 3,946,474 | A |   | 3/1976 | Hahn et al. |
| 4,601,104 | A | * | 7/1986 | Zaiser et al. .................. 30/475 |
| 4,700,481 | A |   | 10/1987 | Barrett |
| 5,024,000 | A | * | 6/1991 | Casal ........................... 30/475 |
| 5,383,275 | A | * | 1/1995 | Hild et al. ..................... 30/475 |
| 5,815,934 | A | * | 10/1998 | Eichberger et al. ........... 30/475 |
| 6,367,523 | B1 | * | 4/2002 | Hu ............................. 144/230 |
| 2003/0168122 | A1 | * | 9/2003 | Razlan et al. ............ 144/154.5 |

FOREIGN PATENT DOCUMENTS

| DE | 28 39 021 | 1/1978 |
| EP | 0 008 798 B1 | 3/1980 |
| EP | 0 563 350 B1 | 10/1991 |

* cited by examiner

Primary Examiner—Derris H. Banks
Assistant Examiner—Shelley Self
(74) Attorney, Agent, or Firm—McKee, Voorhees & Sease, P.L.C.

(57) ABSTRACT

A planer including a housing having a base planing surface for contacting a workpiece, a rotatable blade cylinder located within said housing and including more than one cutting blade for engaging with and planing the work piece. A drive means is associated with the blade cylinder and operable to cause rotation of the blade cylinder. The drive means is located within the housing, above the axis of rotation of the blade cylinder and a chip an debris removal channel passes from the location of the cylinder to the rear end of the planer.

20 Claims, 9 Drawing Sheets

Fig. 9

POWER TOOL

BACKGROUND OF THE INVENTION

The invention to which this application relates is to a power tool, powered by any suitable source but most typically via a main electric or battery supply, which is used in the removal of material from a surface of a typically wooden article. This type of product is most typically referred to as a planer and that is the term used herein.

The provision of powered planer tools is well known. Planers are used in wood working to plane or smooth an uneven surface and may also include the removal of paint layers. The planer includes a blade assembly including a blade holding cylinder which is rotated at high speed. As the planer is moved across the work surface, raised parts of the uneven surface are shaved by the rotating blades which protrude through an aperture in the planing surface of the planar, the planing surface of the planar contacting the work surface and acting as a level and guide.

In order to obtain a smooth finished surface, it is typically necessary for the user of the planer to exert some downward pressure on the tool in order to steady the tool and maintain the rotating blades in contact with the work surface. This can be particularly difficult if the surface being planed is somewhat uneven. Further, maintaining a constant pressure to the tool can be difficult, firstly due to the irregularities in the work surface, and secondly due to the position of the user relative to the tool.

Wood chips, shavings and other debris are produced by the blade and are typically deflected towards the right or left side of the planer by the high speed rotation of the blade assembly. This can result in the work surface being obscured, the wood shavings being deflected towards the user, or often the rotating blade cylinder can become jammed by wood shavings accumulating within the blade chamber of the assembly. Typically the cylinder is mounted within the planer body for rotation about an axis which lies perpendicularly to the direction of movement of the planing surface of the tool along the wood, in use. The cylinder has on its outer periphery at least one cutting blade and the cylinder is offset from the planing surface such that the blade protrudes periodically slightly through an aperture in the planing surface as the cylinder rotates. This therefore means that as the cylinder rotates and the planing surface is moved across the wooden surface, the blade cuts into and removes chips of the wood. Typically, the blade position is adjustable to allow alteration of the cut depth.

A problem with the conventional arrangement is that with the provision of one, or in some instances, two blades on the cylinder spaced 180 degrees apart, the size of chip removed and the spacing between the blades contacting the work piece surface, means that as the planer is moved along the surface a scalloping effect is created on the surface which does not provide the desired effect. Furthermore, removal of the large chips which are created can be difficult.

The rotation of the cylinder is powered by a motor and conventionally the motor is mounted towards the rear of the cylinder. The front end of the planer is that which is at the front of the planer as it is moved along the wood surface. Conventionally it has been believed that to allow the most efficient positioning and drive of the cylinder the motor should be provided at the rear. However the positioning of the motor at the rear of the cylinder creates a problem with respect to the removal of the chips of wood and other debris created by the cutting action of the blade on the cylinder. The problem is that because of the motor position, the chips cannot easily be discarded from the rear of the planer which would be the natural flow of the same and so, instead, relatively complex chip removal channels are required to be formed in the housing along which the chips and debris are required to pass prior to leaving the planer housing and which typically are required to be fan assisted. The complexity of the channels can mean that the same are extremely prone to blockage by the chips which, in turn, prevents use or efficient use of the planer. Furthermore, to accommodate the removal channels, the housing can be required to be increased in size and may also cause the chips and debris to exit the housing at a location and/or side of the housing which is inconvenient to the user.

This problem has previously been recognized and at least one patent, EP0563350 attempts to provide a solution by improving the chip removal paths. In this patent, the motor is still mounted to the rear of the blade cylinder and so it is not possible to move the channels past the drive means motor as it will increase the width of the planer body. Instead, the patent suggests the provision of two channels leading from the cylinder, one passing along a first side of the body and the other passing along the opposing side of the body. The two channels each lead to an opening the user can control via a valve which of the channels is opened to allow the flow of the chips and debris, with the same leaving the planer body towards the front of the planer at a position in front of the blade cylinder. This complex channel arrangement requires the chips and debris to pass along a relatively long distance and in a direction which is required to be fan assisted as it is against the natural direction in which the chips and debris would flow having been removed from the wooden surface.

The aim of the present invention is to provide a planer which is powered and which has significant advantage to the user in terms of usage, in the removal of chips from the wooden surface and also in the removal of debris from the planer.

BRIEF SUMMARY OF THE INVENTION

In a first aspect of the invention there is provided a powered planer tool, said planer tool having a cylinder with at least one cutter blade mounted thereon, drive means to cause the cylinder to rotate about an axis of rotation with a portion of the cylinder exposed through an opening in a planing surface of the planer to cause the removal of material from a surface along which the planing surface is moved, said cylinder and drive means mounted within a housing and wherein the drive means is positioned in the housing above the axis of rotation of the cylinder.

More preferably, the drive means is located in the planer such that the drive means motor lies within a 120 degree arc depending upwardly from the rotational axis of the cylinder.

In one embodiment the drive means is positioned above the said rotational axis of the cylinder but offset to one side or the other of said axis.

The invention accordingly provides, in one embodiment, a planar including: a housing having a planing surface for contacting a workpiece; a blade assembly including a rotatable blade cylinder located within said housing and including one or more cutting blades for engaging with and planing the work piece; a motor associated with the blade assembly and operable to cause rotation of the blade assembly; wherein the motor is located within the planer housing above the blade assembly such that the weight of the motor is above the cutting blades.

In one embodiment the weight of the motor is directly above the cutting blade cylinder.

The blade assembly incorporates the blade cylinder which is preferably rotatably mounted within a blade chamber, the blade chamber being a void space into which chips or shavings from the workpiece are drawn by the stream of air created by the high speed rotation of the blade cylinder.

In one preferred embodiment the housing of the planer includes a chip and debris removal system, said system including at least one channel which passes from an opening at or adjacent to the blade chamber towards the rear of the housing to at least one further opening positioned behind the cylinder with respect to the direction of movement of the planer, thereby allowing the chips and debris to exit towards the rear of the housing.

In use, chips or shavings from the workpiece are scooped forwardly and upwardly and are drawn into the blade chamber and are caused, by the draft associated with the high speed rotation of the blade assembly, to move directly into the channel and out of the rear of the planer.

In one embodiment a further movable passage is preferably incorporated within the planer or attached to the rear of the planer at the end of the channel, and is used to direct the chips or shavings in a direction desired by the planer operator. As the drive means is no longer positioned at the rear of the cylinder the channel can pass in a path substantially adjacent the planing surface of the planer and substantially centrally of the body housing.

In one embodiment the channel from the cylinder leads into at least two passages, each passage having an opening to allow the passage of the chips and debris from the housing, with a first passage leading to an opening on a first side of the body housing, and the other passage leading to an opening at the rear or the other side of the housing. Typically, user selection means are provided to allow one of the passages to be opened to allow the chips and debris to move through the same, with the other passage held closed.

In a further embodiment two channels are provided from the blade chamber, each channel leading to a passage, each passage having an opening to allow the passage of the chips and debris from the housing, with one passage leading to an opening on a first side of the body housing, and the other passage leading to an opening at the rear or the other side of the housing. In one arrangement the two channels both lead from the blade chamber and lie in a side by side arrangement as they pass towards the rear of the housing. Again, user selection means can be provided to allow one of the channels or passages to be opened to allow the chips and debris to move through the same, with the other channel and passage closed.

In a further aspect of the invention, the blade cylinder for the planer is provided with more than two straight cutting blades, said blades positioned substantially 120 degrees, or less, apart around the cylinder periphery.

The provision of additional blades means that in use, a cutting blade contacts with the workpiece surface being planed more frequently during a single revolution of the blade cylinder.

This feature means that when the cylinder is rotating at normal speeds, then, in comparison with the conventional blade cylinders which have one or two straight blades, the length of movement of the planer along the surface before the next blade contacts the surface is reduced. This therefore means that the scalloping effect on the surface is reduced as the removal of material is achieved by a plurality of blade contacts rather than just one blade contact.

In a further embodiment, the blades provided on the cylinder are helically shaped in which case the cylinder includes two or more blades and provides the advantages of reduced scalloping. Preferably the planer is portable. In one embodiment the planer is a portable battery powered tool.

Alternatively, the planer may be provided with a power cord and operated by mains power.

Specific embodiments of the invention are now described with reference to the accompanying drawings.

DETAILED DESCRIPTION OF THE PREFERRED EMBODIMENT

Referring firstly to FIGS. 1–5 there is illustrated a planer 2 in accordance with the invention.

The planer comprises a housing 4 with a planing surface 6 which is provided to be moved along the surface of a workpiece to be planed 8 (shown in broken lines in FIG. 1) in the direction 10. The planing surface includes an aperture 12 and positioned above said aperture, within the body housing 4 is a blade assembly including a blade cylinder 14 in a blade chamber 15. The cylinder is provided to rotate about an axis of rotation 16 in the direction indicated by arrow 11 and is positioned such that the periphery surface 20 of the cylinder passes through the aperture 12 and exposes blades 22, 24, 26, shown in FIG. 6, mounted at spaced locations on the cylinder as shown, to the surface 8 to be planed. The rotation and exposure of the blades causes the removal of wooden chips and shavings from the surface to provide the planing effect.

The cylinder rotation is driven by drive means 28 mounted in the body housing with the drive means typically comprising an electric motor connected to the cylinder to drive the same to rotate in a conventional way. However the position of the drive means with respect to the cylinder is not conventional in that the drive means is positioned in the housing 4 at a location above the axis of rotation 16 of the cylinder and, in this embodiment, slightly to the front of the vertical plane 30 from the axis 16.

This arrangement is in contrast to conventional planers where the drive means has always been provided to the rear or front of the blade cylinder. The provision of the drive means in a position above the blade cylinder means that the weight distribution in the planar is improved for use and further advantages can be implemented as will now be described.

Figure 6:
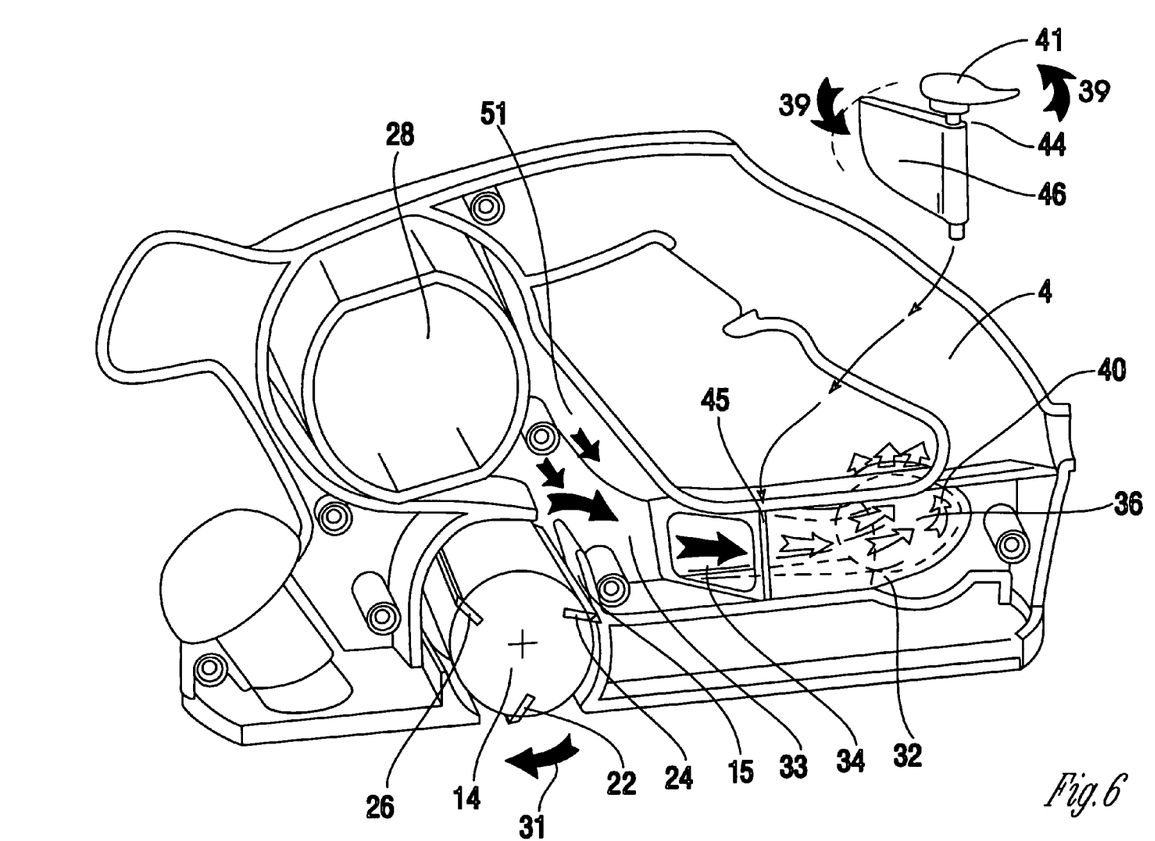
FIG. 6 illustrates a cross section along line A—A of FIG. 2 and illustrates the layout, in one embodiment of the chip removal channel and one of the passages as incorporated in the planer of FIGS. 1–5.

One inventive possibility which is provided with the drive means in this new position is to remove the chips and debris from the planer in a more efficient and novel manner. FIG. 6, which is a vertical cross section through the planer housing and illustrates one embodiment. To remove the chips and debris a channel or channels 32, (when two channels the same are typically side by side), pass from the opening 33 at the blade chamber 15 to collect the chips and debris from the blade chamber from the planing operation of the blade cylinder 14 with blades 22, 24, 26 as it rotates and the planer is moved in the direction 31 as shown in FIG. 6. The chips and debris move along the channel or channels 32 as indicated by arrow 34, and towards the rear of the housing. As the drive means is no longer located to the rear of the cylinder so the channel or channels can be sized as required, can pass substantially adjacent the planing surface and, advantageously, in line with the blade chamber and along the centre of the housing therefore providing a relatively straight, non complex passage and hence increasing the efficiency of chip and debris pick up from the planing surface, and reducing the risk of blockage in the channel.

Figure 1:
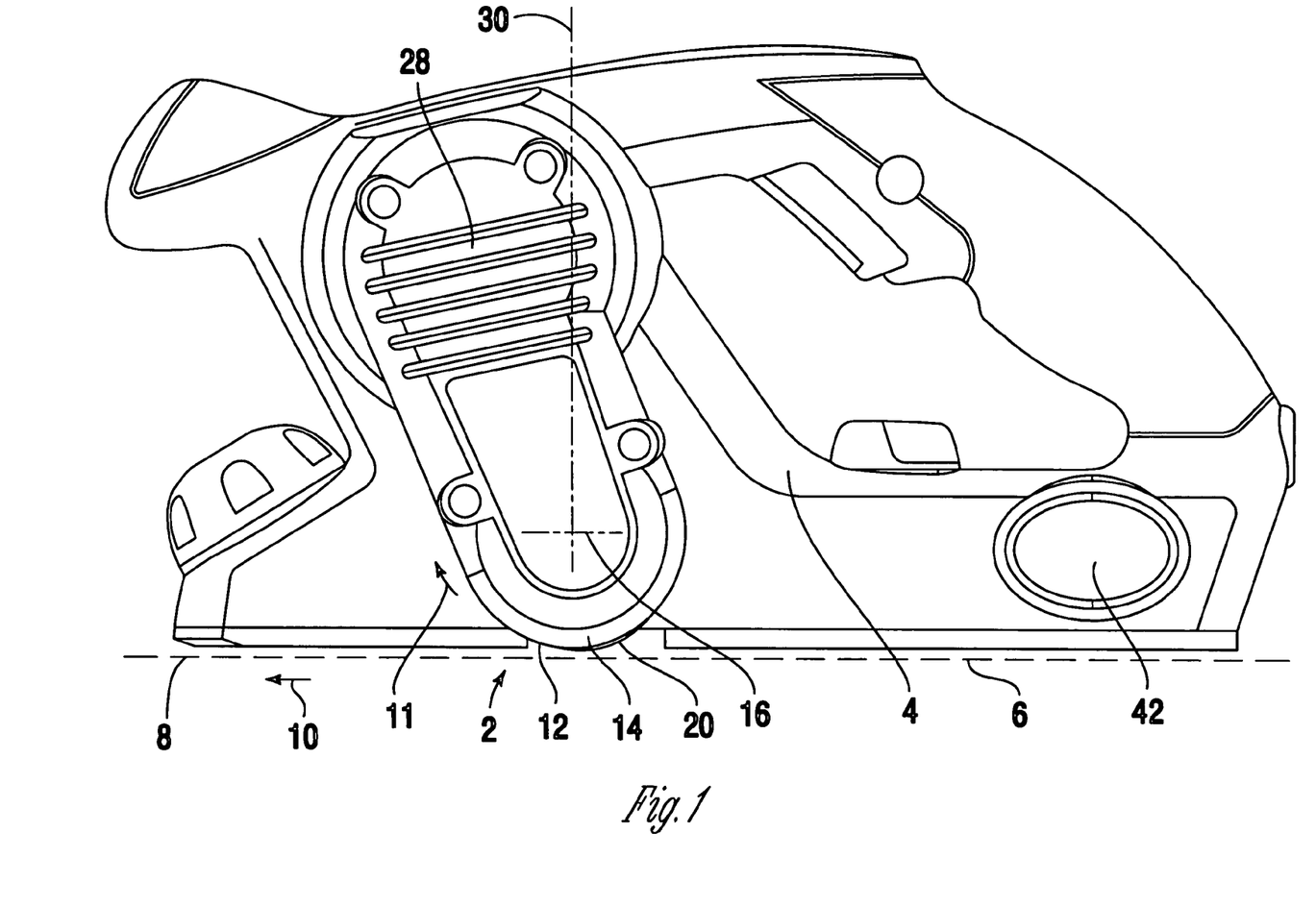
FIG. 1 illustrates an elevation of a planer in accordance with one embodiment of the invention.
Figure 2:
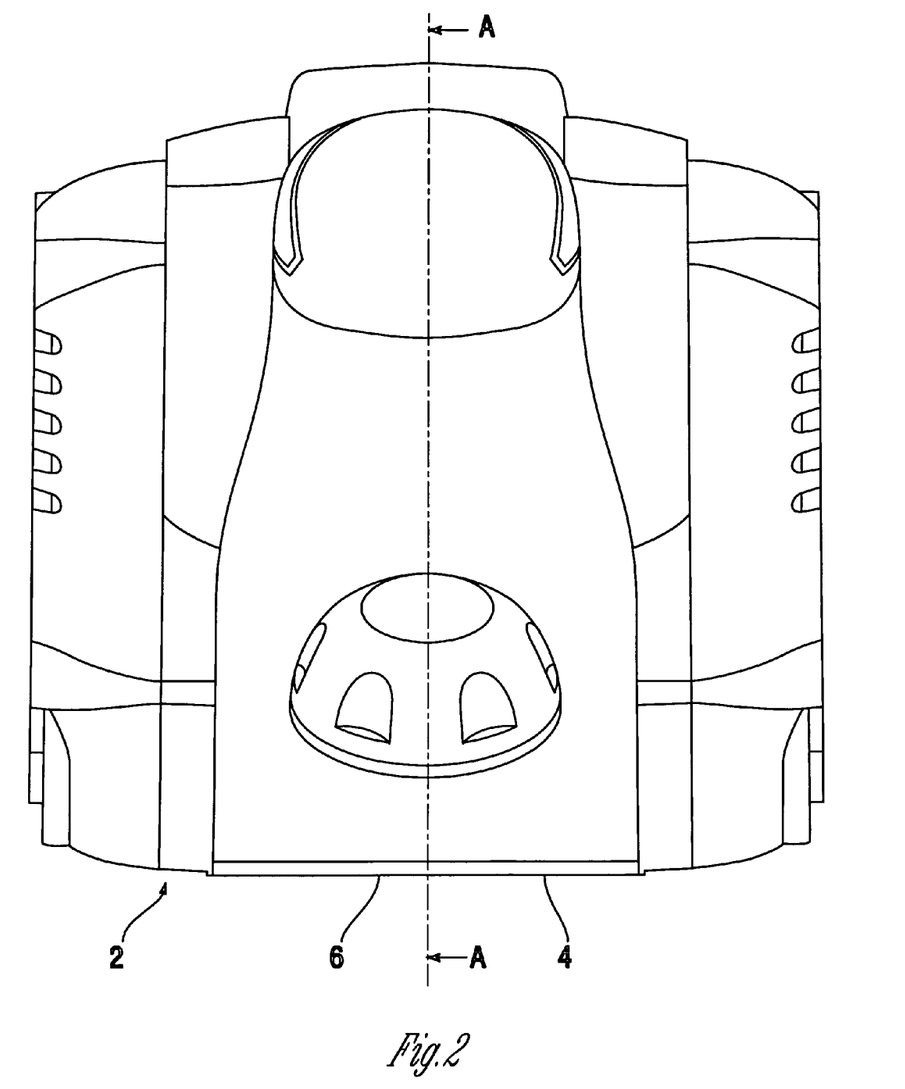
FIG. 2 illustrates a first end elevation of the front end of the planer of FIG. 1.
Figure 3:
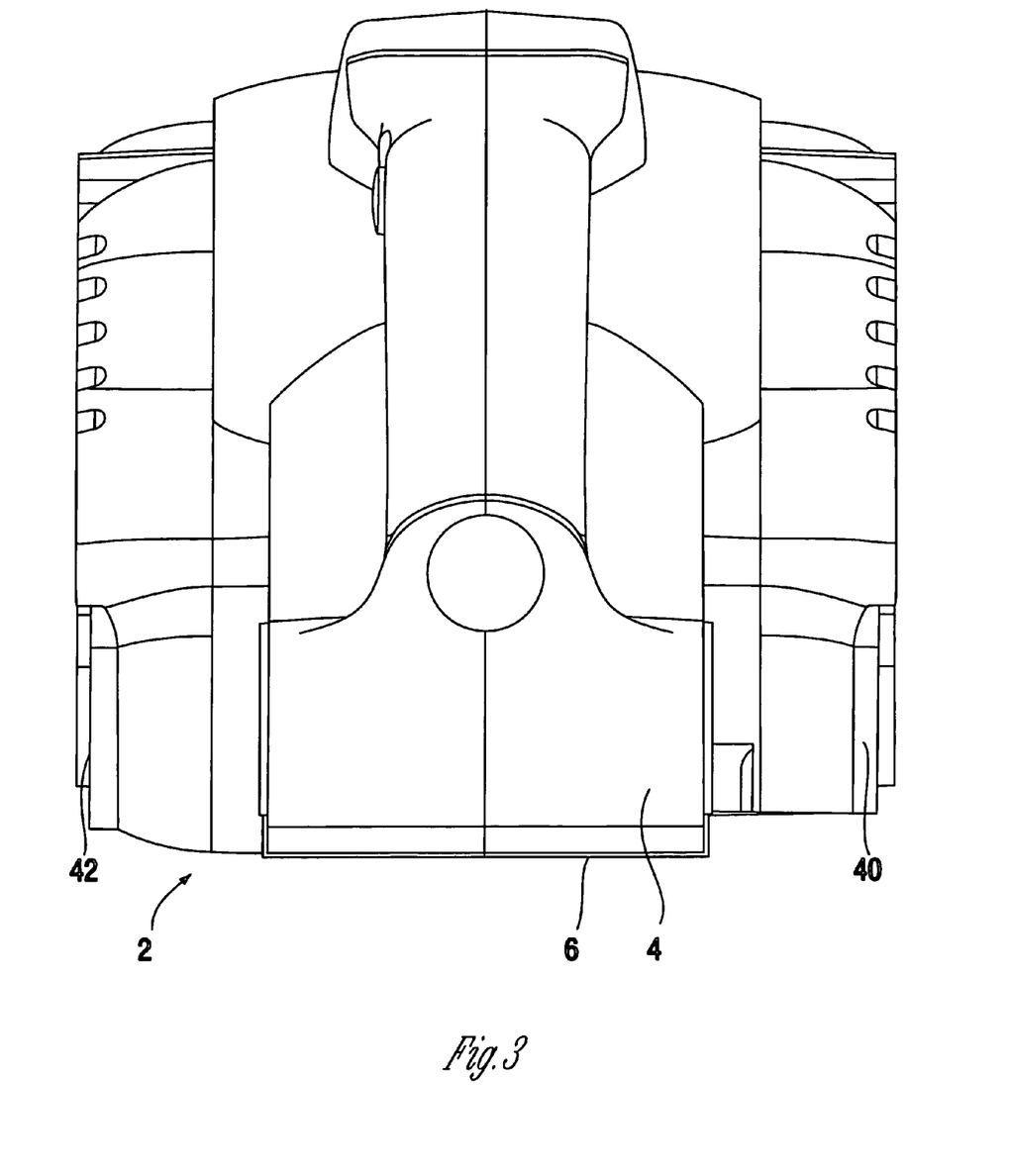
FIG. 3 illustrates a second end elevation of the rear end of the planer of FIG. 1.
Figure 4:
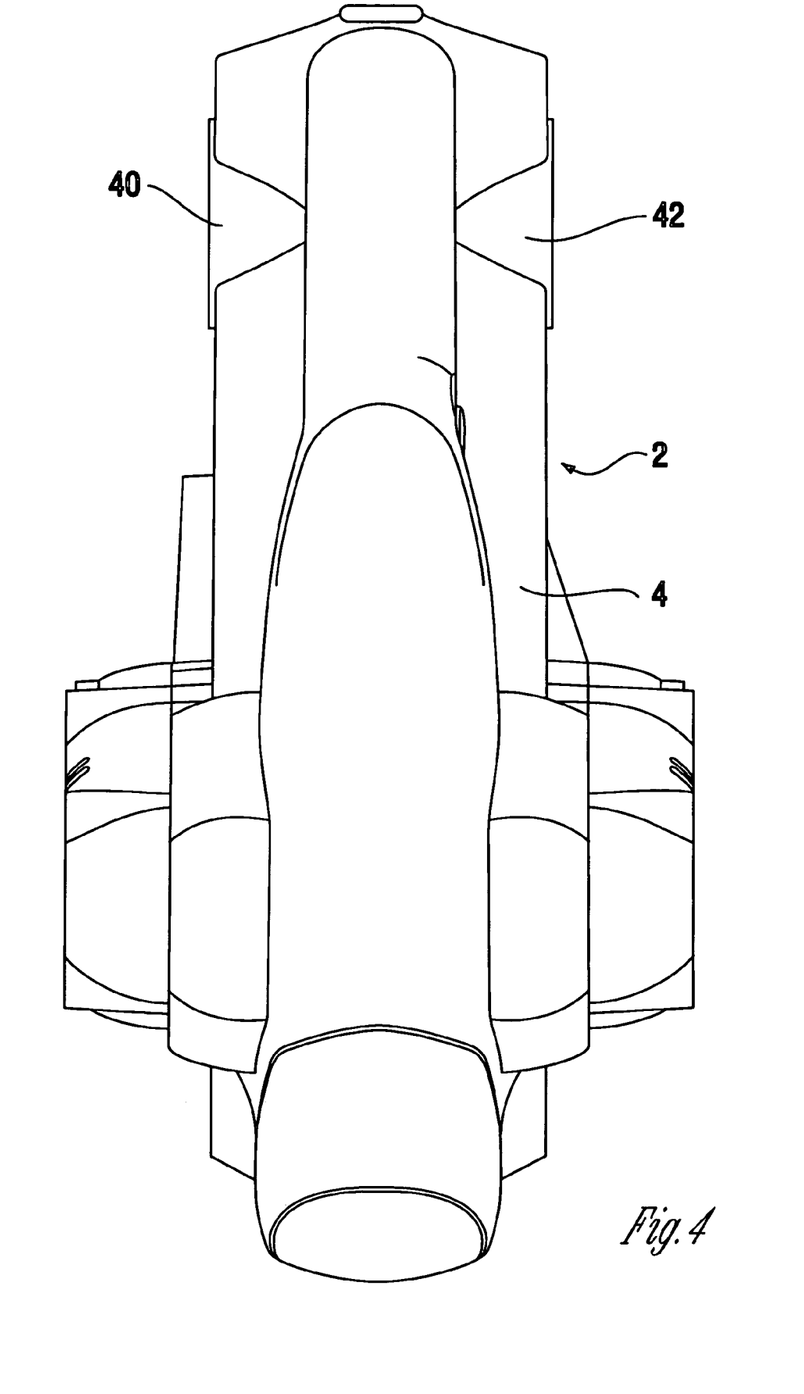
FIG. 4 illustrates a plan view from above of the planer of FIG. 1.
Figure 5:
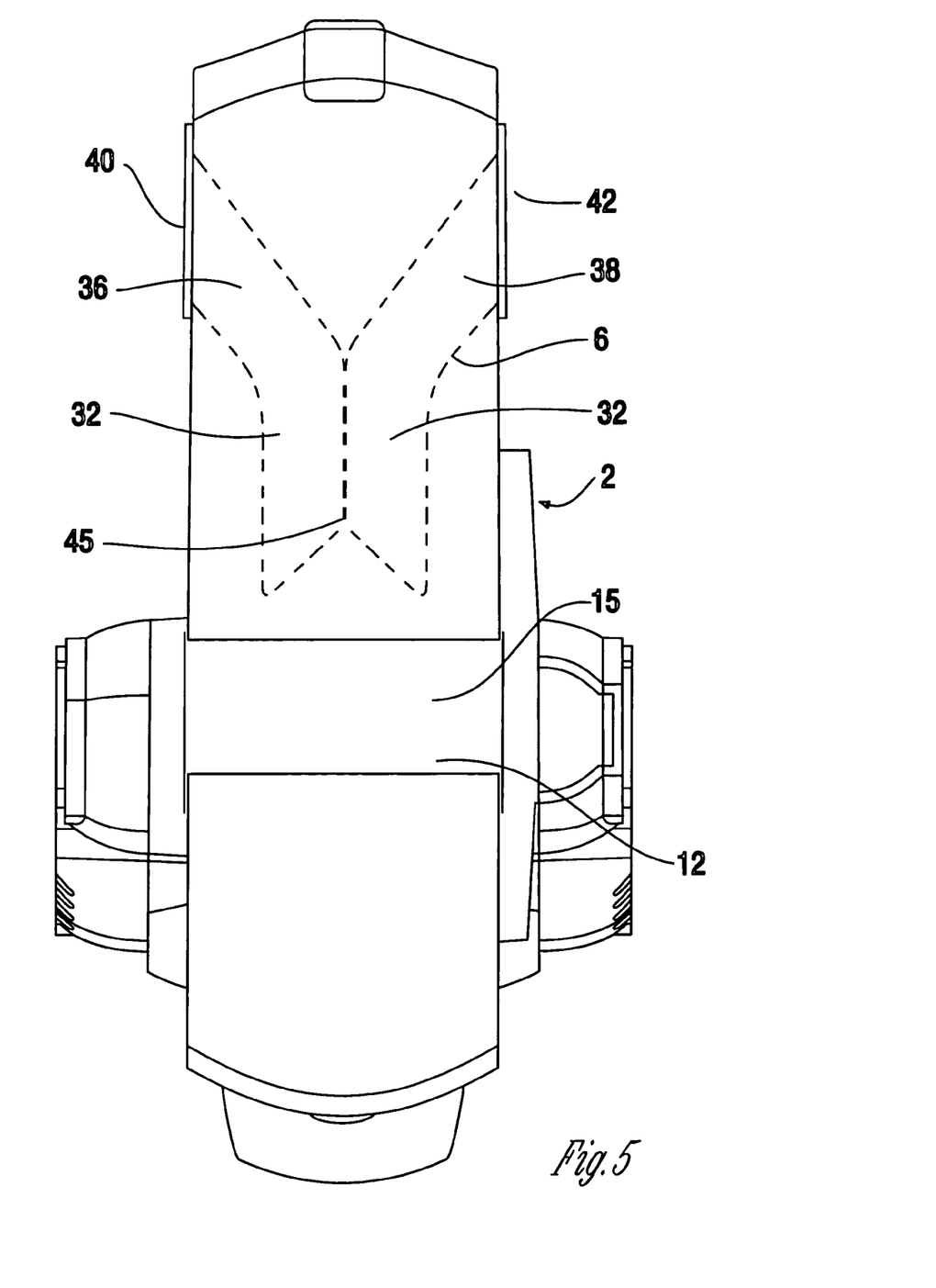
FIG. 5 illustrates a plan view from below of the planing surface of the planer of FIG. 1.

The channels 32 as shown in FIG. 5, lead to, in this embodiment, two passages, 36, 38, which are symmetrically arranged in this embodiment. Both passages lead to an opening, passage, 36 leading to an opening 40 on a first side of the housing 4 at the rear of the same and passage 38 leading to opening 42 on the opposing side of the housing.

In one embodiment, both passages may be open, but more typically, the user can use a selection means 44 as shown in FIG. 16 which includes a flap 46 and the selection means is mounted with regard to the channels at location 45 so that the flap can be pivoted 39 by the user gripping the externally positioned paddle 41, to close off one of the channels and passages and hence cause the chips and debris to exit along the open passage to one, user selected, opening at one side of the planer (thereby allowing the desired disposal of the chips and debris.

In one embodiment one channel 32 is provided or alternatively, and as illustrated in this embodiment, two side by side channels 32 are provided, each running from the blade chamber 15 to one of the openings 40, 42 via a passage 36, 38. In this embodiment the selection means 44 is mounted close to the blade chamber. In the embodiment where one channel is provided, the selection means can be mounted towards the end of the same and adjacent the entries to the respective passages.

Typically, as shown in FIG. 6 there can be provided a motor cooling air exhaust assisted flow 51 which assists in the operation of the motor.

Thus, the location of the drive means as herein described allows the improved debris deposition which represents a significant advantage. It should however be appreciated that the chip channel and passage arrangement as herein described may be used to advantage independently of the position of the drive and therefore the channel and passage arrangement has, in its own right, inventive merit.

In certain instances if the chip or debris removal is not regarded as being of particular importance, the chip and debris removal arrangement shown may not be provided and instead a single channel can be provided which simply exits from the housing at a single opening. However even in this arrangement the positioning of the drive means with respect to the blade cylinder provides significant advantage in the positioning and shaping of the said channel in comparison with conventional powered planers.

Figure 7A:
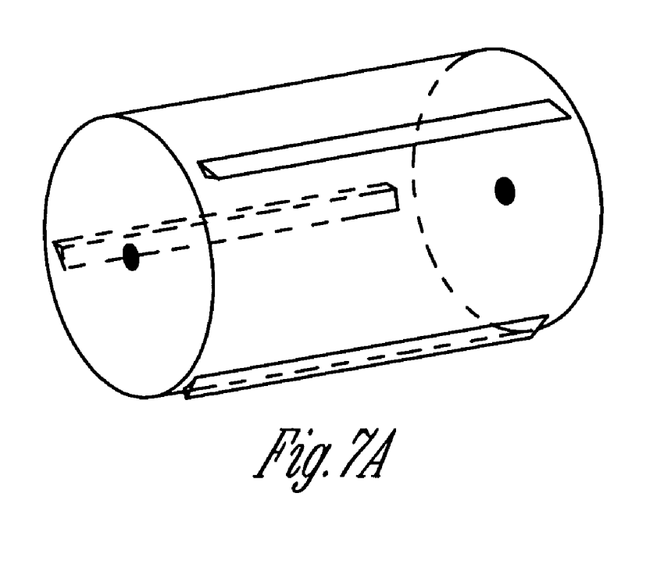
FIGS. 7a and b illustrate two possible cylinder blade arrangements.
Figure 7B:
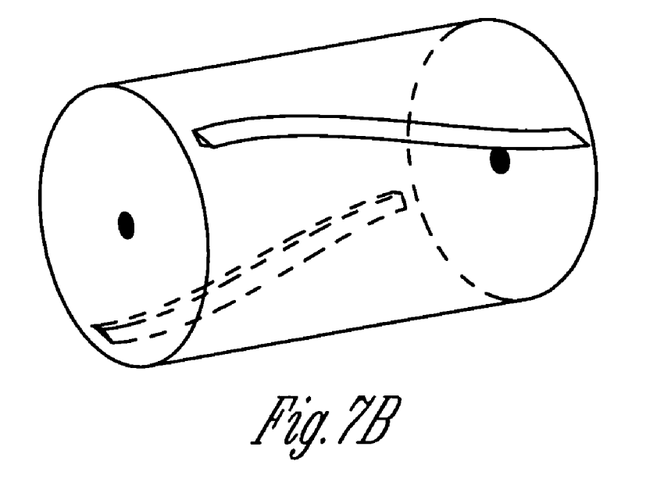

A further advantage is achieved with respect to the cuts which are made by the planer by the provision, as indicated in FIG. 7a of more than two straight planing blades on the cylinder and in FIG. 7b of at least two helical planing blades on the cylinder. In both cases the aim is to ensure that there is more frequent contact between a blade and the surface to be planed in a single rotation of the cylinder than is conventionally the case with single blade cylinders, thereby reducing the scalloping effect caused by only one blade creating the cut in to the article as opposed to, and in accordance with the invention, a series of blade contacts causing the material removal. This also ensures smaller chippings from the wood, the extraction of the chippings s is therefore easier, there is less potential restriction of the discharge and more debris can be collected in the collection means attached to the discharge from the passages.

A further advantage is that by providing an increased number of blades, the life of each blade is increased. For example, by using 3 rather than 2 straight blades then for a given amount of work, the use rate is increased by 50%.

Figure 8:
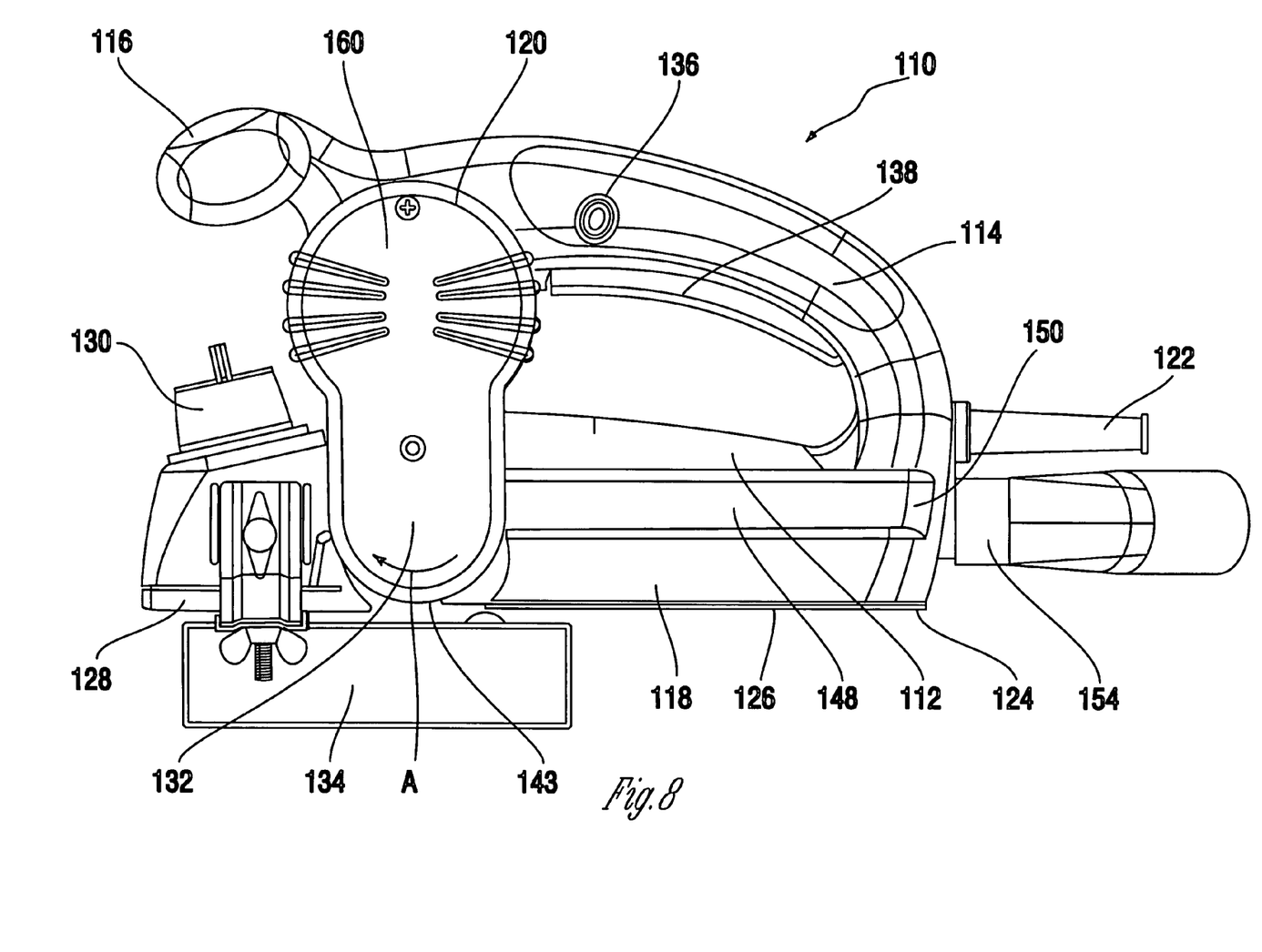
FIG. 8 is a schematic side view of a planer according to a further embodiment of the present invention.

FIG. 8 illustrates a planer 110 according to a further embodiment of the invention. Planer 110 has a body 112, which includes main handle 114, front handle 116, base 118, and belt drive cover 120.

The planer 110 may be mains power operated and for this purpose a power cord 122 is provided at the rear 124 of the body 112. Some models of the planer 110 may be battery powered in which case the power cord 122 extension is not provided.

The planning surface 118 of the planer 110 includes a rear shoe 126 an front shoe 128 which are broad and flat and serve to contact the work surface during use of the tool and maintain an even planing surface. Located above the front shoe 128 at the front of the tool 110 is an adjustment knob 130. Knob 130 is used to adjust the height of the cutting blade assembly 132 relative to a workpiece being planed and this is incorporated in the planer shown in FIGS. 1–5. The operation of the cutting blade assembly 132 will be discussed in further detail below.

An edge guide 134 is removably mounted to the front of the planer 10 in a conventional manner. The edge 134 is used for running along a straight edge of a work piece and assists in keeping the planer parallel to the edge of the work piece. The edge guide 134 can be removed and the planer used without in situations where planning near a straight edge is required.

Power to the planer 110 is provided in accordance with known safety guidelines in a two-step manner. A lock-off button 136 is provided on the side of the main handle 114. The lock off button 136 ensures that the planer 110 cannot be operated without an operator, i.e. the planer 110 cannot be left running while unattended. An on/off trigger switch 138 is provided on the inner side of the main handle 114. An operator wishing to use the planer 110 must firstly depress the lock-off button 136 and pull the trigger switch 138 upwardly towards the handle 114.

Figure 9:
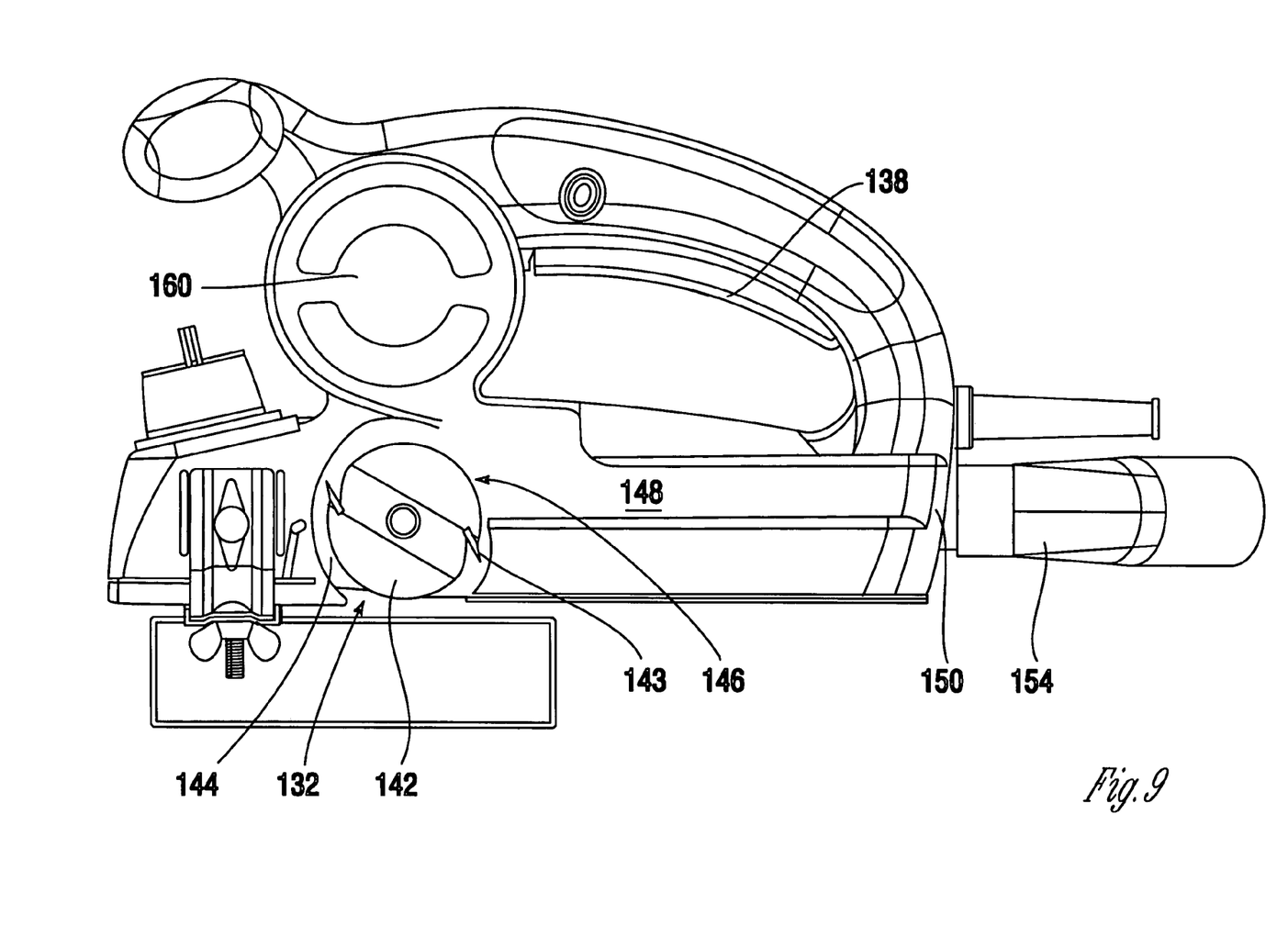
FIG. 9 is an enlarged view of the blade assembly and motor, with the housing cover removed, of the planer shown in FIG. 8.

As best illustrated in FIG. 9, the drive cover 120 encloses, at its lower end, the cutting blade assembly 132, comprising a rotatably mounted cylinder 142, upon which a pair or more blades 143 and equally spaced about the cylinder 142. The cylinder 142 is rotated such that each blade is rotated in the direction opposite to the feed direction of the work piece, known as up-milling, and excess material from the work surface is removed. The direction of the rotation of the cylinder 142 is shown by the arrow marked "A" in FIG. 8.

The chips or shavings from the workpiece are effectively scooped forwardly and upwardly by the action of the blades, together with the draft created by the high speed rotation of the blade assembly 132, into chamber 144 surrounding the blade cylinder 142.

Chamber 144 surrounding the blade cylinder 142 has a further opening 146 in the upper rear surface of the chamber 144, which connects the chamber 144 with an exit chute 148. Exit chute 148 links the chamber 144 with an opening 150 at the rear of the planer 110. The opposite end of the exit chute 148 includes a movable passage 154 which is adapted to fit to the rear of the planer 110. In preferred embodiments, the movable passage 154 is instead provided within the planer 110 itself.

Blade cylinder 142 is driven at high speed by a belt drive (not shown) inked to motor 160, which is operated by trigger switch 138. The motor 160 operates in a conventional manner but instead of being located towards the rear of the tool it is located above, in this case directly, above the blade chamber 144. The weight of the motor being directly above the blade assembly provides additional downward force on the cutting blades thereby providing an improved cut and balance to the planer.

The blade assembly 132 is located towards the planing surface of the planer 110, and is positioned so that the cutting blades 143 contact the workpiece intermediate the front shoe 128 and rear shoe 126. In use, as the blade cylinder 142 is rotated at high speed a stream of air is created which draws chips or shaving from the workpiece into chamber 144 where they are swept directly into and along exit channel 148 towards the rear of the planer 110. The chips or shavings exit the tool via movable passage 154. Movable passage 154 can be shifted from left to right for example and can be positioned to deposit the chips or shavings away from the area being planed.

It will be appreciated that the present invention provides a planer that enables an improved cut and balance due to the weight of the motor being located above the cutting blades. Clearance of wood chippings from the back of the tool keeps the work surface clear and does not obstruct the vision or movement of the user.

It will be understood that the invention disclosed and defined in this specification extends to all alternative combinations of two or more of the individual features mentioned or evident from the text or drawings. All of these different combinations constitute various alternative aspects of the invention.

What is claimed is:

1. A powered planer tool, said planer tool having a cylinder with at least one cutter blade mounted thereon;
    a motor to cause the cylinder to rotate about an axis of rotation with a portion of the cylinder exposed through an opening in a planing surface of the planer to cause the removal of material from a surface of a workpiece along which the planing surface is moved;
    said cylinder and motor mounted within a housing and wherein the motor is positioned in the housing above the axis of rotation of the cylinder; and
    the housing includes a chip and debris removal system, said system, said system has at least one channel that passes from an opening at or adjacent to a blade chamber in which the cylinder is located, said channel leading to at least two passages, each passage having an opening to allow the passage of chips and debris from the housing, with one passage leading to an opening on a first side of the housing to the rear of the blade chamber, and the other passage leading to an opening at a rear or the other side of the housing to the rear of the blade chamber.

2. A planer according to claim 1 wherein the drive means is located in the planer such that the drive means motor lies within a 120 degree arc depending upwardly from the rotational axis of the cylinder.

3. A planer according to claim 1 wherein the drive means is positioned above the said axis of rotation of the cylinder and offset to one side or the other of said axis.

4. A planer according to claim 1 wherein the weight of the motor is above the cutting blades.

5. A planer according to claim 4 wherein the weight of the motor is directly above the cutting blade cylinder.

6. A planer according to claim 1 wherein the cylinder is rotatably mounted within a blade chamber, the blade chamber being a void space into which chips or shavings from the workpiece are drawn by a stream of air created by a high speed rotation of the cylinder.

7. A planer according to claim 1 wherein the chips or shavings from the workpiece drawn into the blade chamber by the cylinder rotation and are caused, by a draft associated with the high speed rotation, to move directly into the at least one channel, and out of the rear, or sides of the housing located towards the rear of the cylinder of the planer.

8. A planer according to claim 1 wherein a movable passage is incorporated within the planer or attached to the rear of the planer at the end of the at least one channel, and is used to direct the chips or shavings in a direction desired by the planer operator.

9. A planer according to claim 1 wherein a user selectable flap is provided to allow one of the passages to be opened to allow the chips and debris to move through the same, with the other passage held closed.

10. A planer according to claim 1 wherein two channels are provided from the blade chamber, each channel leading to a passage each passage having an opening to allow the passage of the chips and debris from the housing, with one passage leading to an opening on a first side of the body housing, and the other passage leading to an opening at the rear or the other side of the housing.

11. A planer according to claim 10 wherein the two channels both lead from the blade chamber and lie in a side by side arrangement as they pass towards the rear of the housing.

12. A planer according to claims 10 or 11 wherein a user selectable flap is provided to allow one of the channels or passages to be opened to allow the chips and debris to move through the same, with the other channel and passage closed.

13. A planer according to claim 1 wherein the channel or channels pass in a path along the housing adjacent the planing surface of the planer.

14. A planer according to claim 1 wherein the channel or channels pass along a path in the housing which is substantially centrally of the housing.

15. A powered planer tool, said planer tool having a cylinder with at least one cutter blade mounted thereon;
    a motor to cause the cylinder to rotate about an axis of rotation with a portion of the cylinder exposed through an opening in a planing surface of the planer to cause the removal of material from a surface along which the planing surface is moved;
    said cylinder and motor mounted within a housing and wherein the cylinder for the planer is provided with more than two straight cutting blades;
    said blades positioned substantially 120 degrees or less, apart around the cylinder periphery; and the housing includes a chip and debris removal system, said system has at least one channel that passes from an opening at or adjacent to a blade chamber in which the cylinder is located, each channel leading to at least two passages, each passage having an opening to allow the passage of chips and debris from the housing, with one passage leading to an opening on a first side of the housing to the rear of the blade chamber, and the other passage leading to an opening at a rear or the other side of the housing to the rear of the blade chamber.

16. A planer according to claim 15 wherein in one rotation of the cylinder at least three different blades contact with the surface to be planed.

17. A powered planer tool, said planer tool comprising:
a cylinder with at least one cutter blade mounted thereon;
a motor to cause the cylinder to rotate about an axis of rotation with a portion of the cylinder exposed through an opening in a planing surface of the planer to cause the removal of material from a surface along which the planing surface is moved;
said cylinder and motor mounted within a housing and wherein the blade cylinder for the planer is provided with two or more helically shaped blades;
said blades positioned substantially 180 degrees or less, apart around the cylinder periphery; and
the housing includes a chip and debris removal system, said system has at least one channel that passes from an opening at or adjacent to a blade chamber in which the cylinder is located, each channel leading to a passage, each passage having an opening to allow the passage of chips and debris from the housing, with one passage leading to an opening on a first side of the housing to the rear of the blade chamber, and the other passage leading to an opening at a rear or the other side of the housing to the rear of the blade chamber.

18. A planer according to claim 1, 15 or 17, wherein the planer is portable.

19. A planer according to claim 1, 15 or 17, wherein the planer is battery operated.

20. A planer according to claim 1, 15 or 17, wherein the planer is provided with a power cord and operated by main power.

* * * * *